W. S. C. MEGILL.

CUSPIDOR.

APPLICATION FILED MAY 21, 1913.

Reissued May 12, 1914. 13,726.

Witnesses:

R C Brocker

Eleanor T. Pink

William S. C. Megill,
Inventor

By George Peterson Sellers
Attorney

COLUMBIA PLANOGRAPH CO., WASHINGTON, D. C.

UNITED STATES PATENT OFFICE.

WILLIAM S. C. MEGILL, OF NATIONAL HOME, WISCONSIN.

CUSPIDOR.

13,726. Specification of Reissued Letters Patent. Reissued May 12, 1914.

Original No. 1,052,840, dated February 11, 1913, Serial No. 691,776. Application for reissue filed May 21, 1913. Serial No. 769,116.

*To all whom it may concern:*

Be it known that I, WILLIAM S. C. MEGILL, of National Home, Wisconsin, have invented a Cuspidor, of which the following is a specification.

My invention relates to cuspidors, to wit, those vessels having a contracted neck, separating the body from the mouth thereof, and a funnel-shaped top-portion above said neck.

The objects of my invention are, first, to provide means for holding the cuspidor in shape and supporting the upper rim thereof, said means being adapted to be used also as a handle; secondly, to provide a trap-lid covering the opening in the cuspidor and provided with means for opening it at one side of the vessel; thirdly, to make aforesaid lid, together with its support, readily detachable for the purpose of cleansing and also in order than it may be attached to existing cuspidors without alteration of the latter; and fourthly, to provide a special form of bail-mounting, together with means for holding the bail in protected position beneath the rim of the cuspidor when not in use.

My invention may best be understood from the accompanying drawings, taken with the following detailed description thereof, said drawings illustrating two forms of embodiment of my invention, to wit, a sheet-metal cuspidor and a cast cuspidor.

Figure 1:
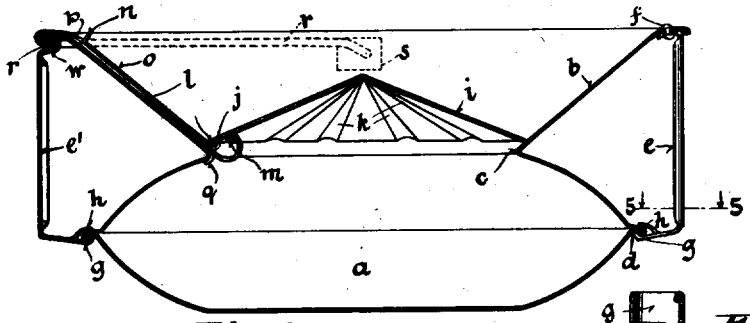
Figure 3:
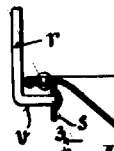
Figure 5:
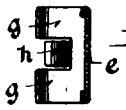
Figure 4:
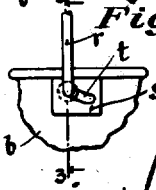
Figure 2:
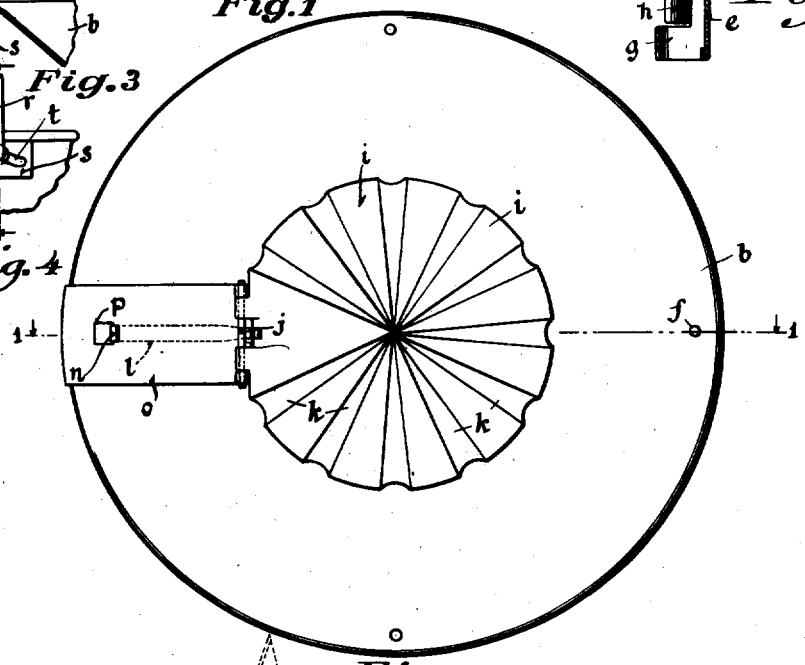
Figure 6:
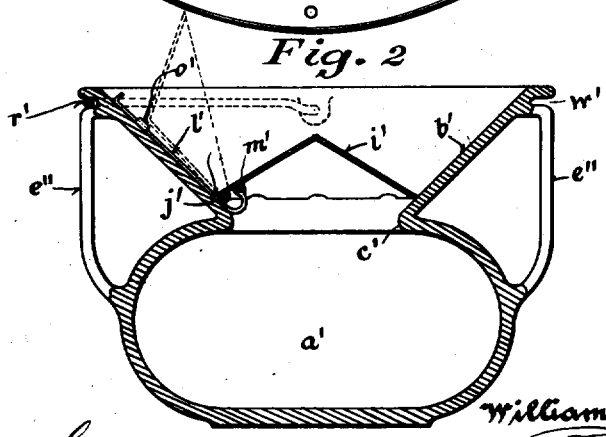

In said drawings Figure 1 is a vertical axial sectional view of a sheet-metal cuspidor according to my invention, the section plane thereof being shown at 1 in Fig. 4; Fig. 2 is a plan-view of the same cuspidor; Fig. 3 is a fragmentary axial section through one edge of the rim of the cuspidor, taken in a plane at right angles to Fig. 1 to show the bail-mounting, the section-plane being indicated by the line 3 in Fig. 4; Fig. 4 is an elevation of the same parts as shown in Fig. 3, seen from the left of the latter figure; Fig. 5 is a fragmentary plan-view of the end of the handle or brace, the latter being shown in section on the plane 5 of Fig. 1; and Fig. 6 is a vertical axial section of a cast cuspidor containing my invention in simpler form.

In these drawings every reference letter and numeral always refers to the same part.

The first form, Figs. 1 to 5, is a cuspidor of the usual shape comprising a body *a* and conical top-portion or funnel-mouth *b* separated by the contracted neck *c*. It is customary to form such sheet-metal cuspidors with a belly-seam *d*, which in the present case forms the point of attachment for one of the braces *e*; but while such seam forms a convenient means of attachment, I wish it distinctly understood that it is not essential to my invention.

According to my invention, I provide a set of vertical members *e* which extend between the rim of the top-portion *b* and the widest part of the body *a*, which is in this case, located at the belly-seam *d*. These members *e* perform two functions, as braces and as handles. I have found that one of the principal objections to this type of receiver as compared with the common form of spittoon, which has no contracted neck, is that in handling it easily gets out of shape, either by having a weight fall upon its edge or by getting kicked or otherwise mishandled. Thus the rim of the top *b* becomes easily warped or crooked and the neck *c* and upper part of the body *a*, becomes dented and out of shape, so that the vessel may have to be discarded because of its unsightly appearance. I avoid this by means of the brace members *e*, which may be two, four or more in number as desired, and support the rim directly from the belly-seam so that it is always parallel thereto; and it is to be observed that these brace-members *e* form most convenient handles because they are protected from contamination by being under the rim of the cuspidor. In the present case the members *e* are shown as riveted at *f* to the upper edge of the conical top, and at the bottom each member *e* is provided with a clip consisting of three opposed claws, *g*, *g* and *h*, adapted to grip opposite sides of the belly-seam. My invention, however, is not limited to this mode of attachment. My cuspidor is also preferably provided with a hinged lid *i* which is pivoted at one side to and turns upon a pintle-rod *j* mounted at one edge of the neck *c*. Said lid *i* is shown as being formed with a number of radial drainage channels *k*, at the bottom of which the cap is notched as shown to give passage to the interior. This lid is arranged to be opened from the upper edge of the top-portion $b$, so that the hands need not become soiled, by means of a reciprocating bar $l$, which has a recurved end pivoted at $m$ on the lid $i$ just beyond the pivot thereof, and said bar $l$ rests against the face of the top $b$ and is inclosed by suitable guides of either of the two forms here shown, and has its upper end bent at a right angle to form a finger-tab $n$ projecting sufficiently to enable it to be reciprocated, thus opening and closing said lid.

In the first form shown in the drawings, the mountings of the lid $i$ and bar $l$ are arranged to be detachable from the rest of the vessel so that the two can be cleaned separately. This is provided by making a special member $e'$ taking the place of the member $e$ on the right of Fig. 1, said member having an extension $o$ which passes over the rim of the top-portion $b$ and down the upper side of same to the neck $c$, and having a recess therein to receive the bar $l$, and a hole $p$ near the top through which the tab $n$ projects. The lower end of the extension $o$ is provided with a hook $q$ catching over the edge of the neck $c$ so as to hold the member $e'$ and its attachments in position; but it will be seen that the detachable clip $g$ $h$ on the lower end of the member $e'$ enables the whole to be readily detached by disengaging said clip and then bending the member $e'$ outwardly until it is disengaged from the edge of the top $b$, its resiliency being sufficient to enable this to be done without causing it to lose shape.

As a means for transporting the cuspidor from place to place more convenient for long distances, I provide the semicircular bail $r$, which in use is adapted to hang vertically, supporting the cuspidor at opposite points of the rim of the top $b$ from its two ends; but when not in use, said bail is adapted to fold and conceal itself completely beneath the extending rim of the top $b$ thereby protecting it from all soiling and contamination. To enable this to be done, I provide two angular pieces $s$, which are attached by rivets to the under side of the rim, as shown in Figs. 3 and 4, each of said members $s$ having a vertical flange perforated by a slot $t$, which extends to one side and downwardly from the suspension-point, the two slots in the opposite ears $s$ being on the same side of the diametral plane. The ends of the bail $r$ are bent at right angles, as shown at $v$, the right-angled end $v$ being sufficiently long to enable it to engage in the slot $t$ while the main portion of the bail clears the rim of the top $b$; but the natural spring of the bail $r$ causes the ends $v$, as soon as the bail is turned down so as to be below the plane of the rim, to spring together so that the ends of the bail are under and covered by the rim. To hold up the middle of the bail I form the member $e'$ with an inturned loop $w$, which extends under the rim and is of the proper size to enable the bail to slide into it and hold it there by resilient force.

The cast form of cuspidor shown in Fig. 6 operates on the same principles, except that some of the features above described are omitted; comprising a body $a'$, conical top-portion $b'$, contracted neck $c'$, lid $i'$ pivoted to the pintle $j'$, and reciprocating-rod $l'$ having a pivotal connection with the lid at $m'$ and operating as previously described. The pintle $j'$ is in this case secured to fixed ears $u$ on the edge of the top-portion and the reciprocating rod $l'$ is guided in a fixed guide-strap $o'$. The members $e''$, which replace the members $e$, extend from the widest portion of the body to the edge of the rim as heretofore, but they are cast on, and the bail $r'$ is mounted as heretofore, a notch or groove $w'$ being left between member $e''$ and rim opposite the middle of the bail $n'$, for its engagement under the edge of the rim as previously described.

Various changes and modifications in the constructions as herein shown may be made without departing from the spirit of my invention, and I wish it understood therefore that the latter is not otherwise limited than by the proper scope of my claims.

Having thus described my invention, what I claim as new and desire to secure by Letters Patent is:

1. The combination with a cuspidor having a bellied body and a flared conical top-portion separated therefrom by a contracted neck, of rigid members extending between the widest part of said body and the rim of said top-portion, and equably disposed about the periphery thereby strengthening it and holding it parallel to said body when in use or in the molding of the same, said members leaving a substantially triangular space between themselves and the body of the cuspidor sufficient for the insertion of the hand.

2. In combination with a cuspidor having a bellied body and a belly-seam and a flared conical top-portion separated from said body by a contracted neck, of two or more struts extending between said belly-seam and the edge of said top-portion and equably disposed about the periphery, said members leaving a substantially triangular space between themselves and the body of the cuspidor sufficient for the insertion of the hand.

3. In a cuspidor having a flared conical top-portion, a lid pivoted to one side thereof and a member for opening said lid comprising a sliding bar connected in a movable manner at one end to said lid near the pivotal point thereof and extending to a distance from said lid.

4. In a cuspidor having a flared conical top-portion, a lid pivoted to one side thereof and a member for opening said lid lying on the upper face of said top-portion and extending to the top-edge thereof and provided with manipulating-means at its upper end; said member extending under the pivot of said lid and being connected with said lid on the under side thereof whereby it is adapted by an upward pull to open said lid.

5. In a cuspidor having a base portion and a flared conical top-portion separated therefrom by a neck, a lid pivoted to one side thereof, and a member for opening said lid lying on the upper face of said top-portion and extending to the top-edge thereof and provided with manipulating-means at its upper end; said member extending under the pivot of said lid and being connected with said lid on the under side thereof whereby it is adapted by an upward pull to open said lid; in conjunction with a member overlying and protecting said first-named member upon the upper face of said top-portion and forming a guide therefor, said last-named member having a detachable hook at one end adapted to grip over the edge of said neck and at the other end being hooked over the rim of said top-portion.

6. In a cuspidor having a base portion and a flared conical top-portion separated therefrom by a neck, a lid pivoted to one side thereof, and a member for opening said lid lying on the upper face of said top-portion and extending to the top-edge thereof and provided with manipulating-means at its upper end; said member extending under the pivot of said lid and being connected with said lid on the under side thereof whereby it is adapted by an upward pull to open said lid; in conjunction with a member overlying and protecting said first-named member upon the upper face of said top-portion and forming a guide therefor, said last-named member having a detachable hook at one end adapted to grip over the edge of said neck and at the other end being hooked over the rim of said top-portion, and having a recurved loop extending under the rim of said top-portion; and a bail pivoted at opposite sides of said cuspidor and the middle portion of which is adapted to be caught in said loop below the said rim.

7. In a cuspidor having a base portion and a flared conical top-portion separated therefrom by a neck, a lid pivoted to one side thereof, and a member for opening said lid lying on the upper face of said top-portion and extending to the top-edge thereof and provided with manipulating-means at its upper end; said member extending under the pivot of said lid and being connected with said lid on the under side thereof whereby it is adapted by an upward pull to open said lid; in conjunction with a member overlying and protecting said first-named member upon the upper face of said top-portion and forming a guide therefor, said last-named member having a detachable hook at one end adapted to grip over the edge of said neck and at the other end being hooked over the rim of said top-portion and extending from said rim downwardly to the widest portion of the body of said cuspidor and forming a support for said rim.

8. In combination with a cuspidor having a bellied body provided with an annular peripheral flange, and a flared conical top-portion separated from said body by a contracted neck, of a detachable member having a hook at one end engaging around said neck and extending thence radially up the upper face and around the edge of said top-portion and thence downward to said flange and having a detachable engagement therewith; a lid pivoted to the inner end of said member; and a lid-opening device comprising a reciprocating-bar guided by said member on the upper face of said top-portion and connected with said lid at its lower end and having a manipulating device at its upper end.

9. In combination with a cuspidor having a flared rim, a pair of depending ears mounted under said rim at opposite sides thereof, said ears having each a slot extending to one side and slightly downward from the diametral plane and the two slots extending on the same side of the diametral plane, and a semicircular bail having its ends bent to pass through said slots; said bail being adapted by sliding in said slots to pass over and below said flared rim, and the ends of said bail being adapted to spring together when in said position so that they slide endwise in said slots and said bar is completely covered by said flared rim.

10. In combination with a cuspidor having a flared rim, a pair of depending ears mounted under said rim at opposite sides thereof, said ears having each a slot extending to one side and slightly downward from the diametral plane and the two slots extending on the same side of the diametral plane, and a semicircular bail having its ends bent to pass through said slots; said bail being adapted by sliding in said slots to pass over and below said flared rim and the ends of said bail being adapted to spring together when in said position so that they slide endwise in said slots and said bail is completely covered by said flared rim, in conjunction with a recess on the under side of said rim adapted to receive the middle of said bail whereby it is held in position under said rim.

11. In a cuspidor having a flared conical top-portion and a contracted opening at the bottom of said top-portion, a lid normally seated at the opening and pivoted to one side thereof, and a sliding bar lying on the upper side of said conical top-portion and connected in a movable manner with said lid near the pivot thereof and having means on its upper end for moving it and thereby opening said lid.

12. In a cuspidor having a flared conical top-portion and an opening at the lower end thereof, a lid pivoted at one side of said opening and normally lying over the same and opening upwardly, a sliding bar lying on the upper side of said top-portion and completely within the same, said bar having manipulating means at its upper end and being connected in a movable manner to said lid near the pivot thereof, and a stationary guiding device lying upon the upper face of said conical top-portion and overlying said bar and recessed on the under side to receive it.

In witness whereof I have hereunto set my hand in the presence of two witnesses.

WILLIAM S. C. MEGILL.

Witnesses:

SAMUEL J. DUNHAM,
W. SCHULTZ, Jr.

Copies of this patent may be obtained for five cents each, by addressing the "Commissioner of Patents, Washington, D. C."